May 21, 1968 — W. A. SCHAICH — 3,383,827
MULTI-PACK CONTAINER CARRIER AND METHOD
OF ASSEMBLING TO CONTAINERS
Filed Dec. 10, 1965
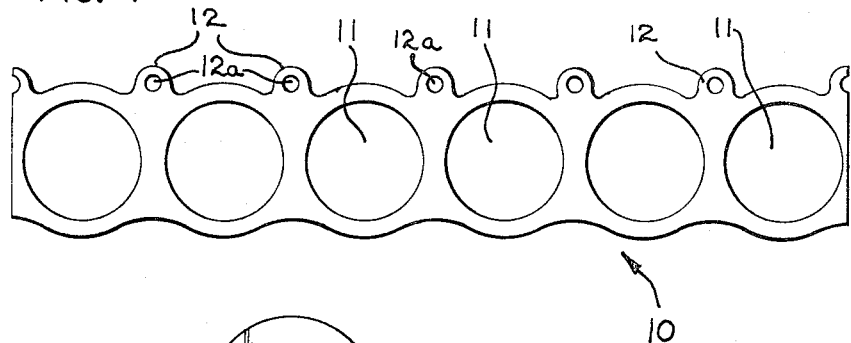
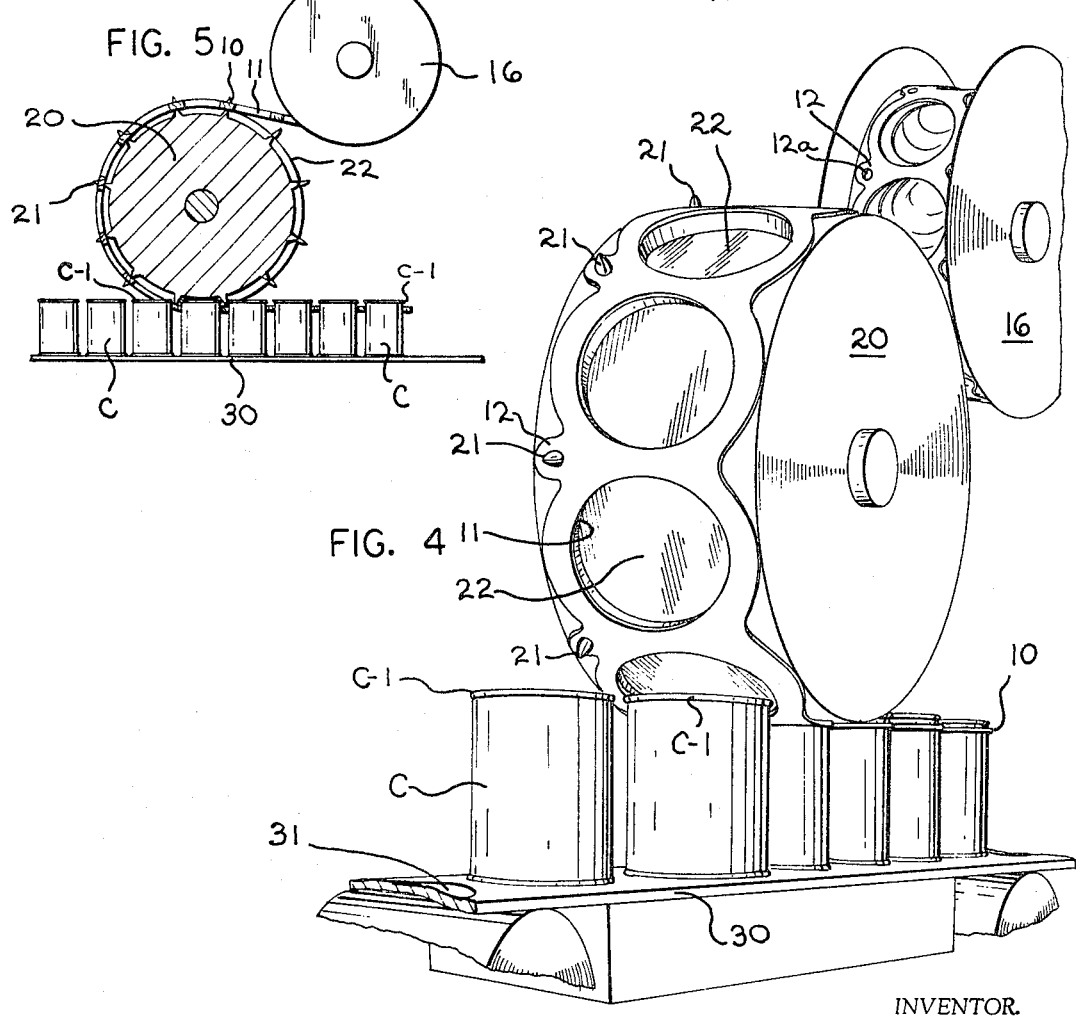
INVENTOR.
WILBUR A SCHAICH May 21, 1968   W. A. SCHAICH   3,383,827
MULTI-PACK CONTAINER CARRIER AND METHOD
OF ASSEMBLING TO CONTAINERS
Filed Dec. 10, 1965   3 Sheets-Sheet 2
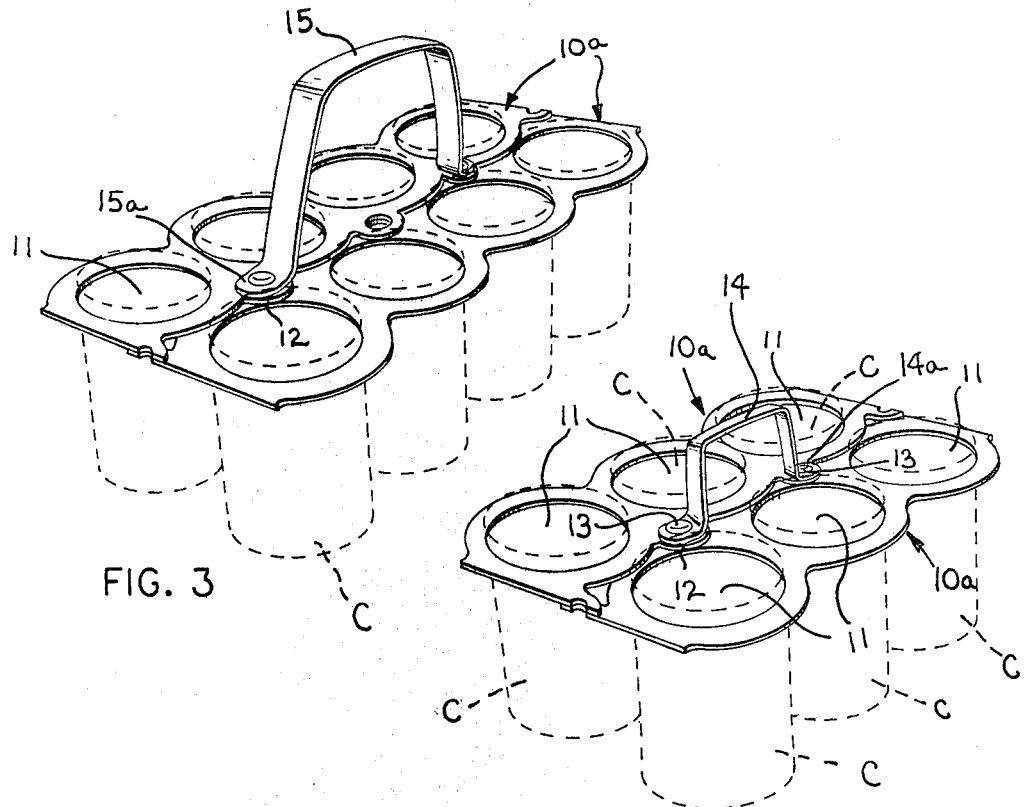
FIG. 3
FIG. 2
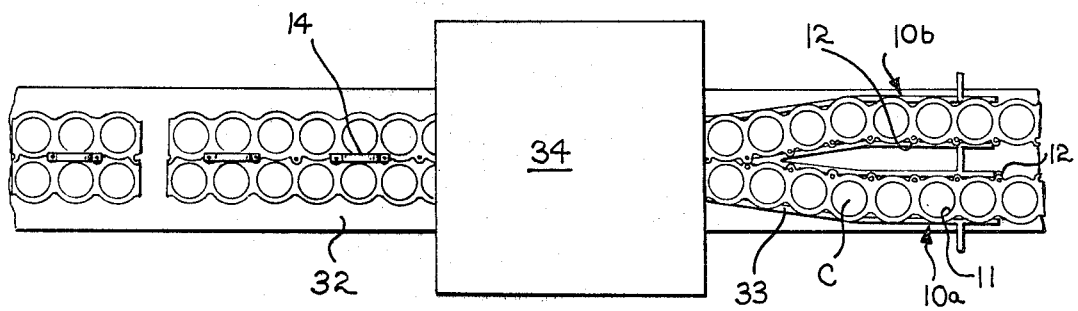
FIG. 6
INVENTOR.
WILBUR A. SCHAICH
BY Philip M. Rice
& W. A. Schaich
ATTORNEYS May 21, 1968

W. A. SCHAICH 3,383,827

MULTI-PACK CONTAINER CARRIER AND METHOD
OF ASSEMBLING TO CONTAINERS

Filed Dec. 10, 1965

INVENTOR.
WILBUR A. SCHAICH
BY Philip M. Rice
& W. A. Schaich

ATTORNEYS

United States Patent Office 3,383,827
Patented May 21, 1968

3,383,827
MULTI-PACK CONTAINER CARRIER AND METH-
OD OF ASSEMBLING TO CONTAINERS
Wilbur A. Schaich, Maumee, Ohio, assignor to Owens-
Illinois, Inc., a corporation of Ohio
Filed Dec. 10, 1965, Ser. No. 512,960
9 Claims. (Cl. 53—26)

ABSTRACT OF THE DISCLOSURE

The invention relates to a multi-pack container carrier and method of assembling same, such carrier being formed by assembling two webs of resilient plastic material, each web having lengthwise aligned apertures therein respectively adapted to engage and hold the neck portions of an equal number of containers and one of the webs having at least one laterally projecting portion which lies in contiguous relation to a portion of the other web when the containers respectively engaged by the webs are disposed in side-by-side relation, the two webs being held in engagement by securing means cooperating with the aforementioned contiguous portions and applied after the webs are assembled to the containers.

This invention relates to an improved multi-pack carrier for the unitary packaging of a plurality of containers, and more particularly to a simple plastic carrier for packaging two aligned rows of containers, such as beer cans, in a unitary package which is commonly referred to as a "six-pack carton." Additionally, this invention relates to a process for assembling a multi-pack carrier embodying this invention onto a selected number of containers.

It has been quite common to merchandise a plurality of bottles, cans, or jars in multi-packs, generally consisting of six-container units, although packs of four and eight have also appeared in the market place. Since the multi-pack unit is intended for a single use, namely, to carry the containers from the packers plant to the retail store and then to the home or other point of consumption, where the carrier is thrown away, it is obvious that the construction of any multi-pack carrier should employ a minimum of low cost material, and the manufacture of the carrier and assembly of the carrier on the containers should be accomplished automatically and at high speed so as to keep the cost of the disposable carrier to as low a level as possible.

Multi-pack carriers have heretofore been employed comprising a punched sheet of plastic material, for example, see United States Patent No. 2,874,835. While this type of carrier can be economically manufactured, very complicated machinery is required to effect the assembly of the carrier to the containers due primarily to the fact that it has been found necessary to simultaneously expand a number of the container receiving openings in the carrier to permit the carrier to be assembled to the containers embodied in the particular pack. While such machines have been successfully developed and used, for example as shown in Patent No. 3,032,943, the reproductive cost of such machines is well in excess of $50,000, and this high-capital investment in assembling machinery seriously penalizes the over-all economies involved in utilizing such a carrier.

Accordingly, it is the object of this invention to provide an improved multi-pack carrier for containers which can, not only be fabricated at a minimum cost, but can be assembled to the desired number of containers by a very simple mechanical operation.

A specific object of this invention is to provide an improved multi-pack carrier for packaging a plurality of containers in two parallel rows wherein the carrier is formed in two segments which are respectively separately assembled to two rows of containers and then assembled in a unitary package by simple riveting, heat sealing or adhesive operations.

Other objects and advantages of this invention will become apparent from the following description thereof, taken in conjunction with the annexed sheets of drawings on which there is shown several embodiments of this invention.

On the drawings:

FIGURE 1 is a plan view of a plastic carrier segment constructed in accordance with this invention;

FIGURE 2 is a perspective view illustrating the assembly of two carrier segments of the type shown in FIGURE 1 to six containers to form a "six-pack";

FIGURE 3 is a perspective view showing the assembly of two carrier segments of the type shown in FIGURE 1 to eight containers to form an "eight-pack";

FIGURE 4 is a schematic perspective view of apparatus for assembling a carrier segment web to a row of containers:

FIGURE 5 is a reduced scale, schematic elevational view, shown partly in section, of the apparatus of FIGURE 4;

FIGURE 6 is a schematic plan view of apparatus for assembling two carrier webs;

Figure 7:
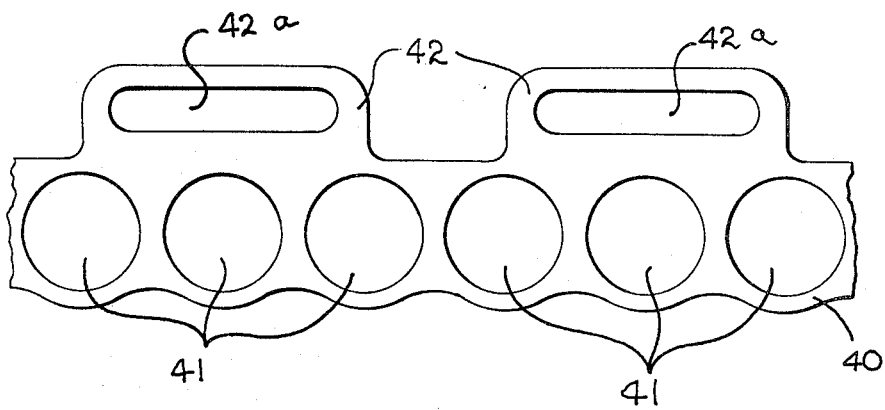
FIGURE 7 is a plan view of a modified plastic carrier segment web.

Referring to FIGURE 1, there is shown a carrier segment web 10 comprising a thin web of resilient plastic material, such as polyethylene, polystyrene, polyvinyl chloride or any similar thermoplastic material which can be readily extruded in sheet form and which has a raw material cost sufficiently low so as to economically permit the use of the material as a disposable multi-pack carrier. A plurality of apertures 11 are punched out of the web 10 in lengthwise aligned relationship. Each aperture 11 is proportioned so as to snugly engage the top portion of the container for which the carrier is to be employed. Additionally, a plurality of integral tab portions 12 are provided on web 10 which project laterally from the web 10 and are preferably respectively disposed intermediate the container apertures 11. In the event that rivets are to be employed in the subsequent assembly operation to be hereinafter described, an aperture 12a is punched out of each tab portion 12.

As shown in FIGURE 2, if a six-pack carrier is desired, then two web segments 10a are employed, each having three apertures 11, and are assembled onto their respective containers C so that the tab portions 12 are disposed in overlapping, contiguous relationship and may then be secured together in any conventional fashion, such as by heat sealing, an interposed adhesive, or by rivets 13.

In the event that it is desired to attach a carrying handle 14 to the resulting carrier, the ends 14a of the carrying handle may be conveniently secured to the carrier in the same operation as secures the tab portions 12 to each other. Thus, as shown in FIGURE 2, the rivets 13 respectively traverse suitable apertures in the handle ends 14a and the aligned apertures 12a of the tab portions 12.

In the six-pack modification in FIGURE 2, the ends 14a of handle 14 are respectively secured to the two immediately adjacent sets of tab portions 12. If an eight-pack carrier is desired then, as shown in FIGURE 3, a handle 15 is provided having ends 15a which respectively align with and are secured to the first and third set of overlapping tab portions 12.

The advantages of a carrier formed in accordance with this invention will become more apparent when viewed in the light of the assembling operations by which the carrier segment webs can be assembled to the containers and then the carrier webs united to form the desired container pack. Referring to FIGURES 4 and 5, each carrier segment web 10 may be automatically assembled to a fast moving line of containers C through the simple expedient of rolling each successive container aperture 11 in the carrier segment web 10 over the top of a container C. Thus, the carrier segment web 10 may be conveniently formed as a continuous strip which is applied to the periphery of an applicating drum 20 from a supply reel 16. Drum 20 is rotated by a suitable power source (not shown). To eliminate slippage of the carrier web 10, the applicating drum 20 may be provided with a plurality of radially projecting tapered pins 21 which respectively engage the tab apertures 12a. If no apertures 12a are utilized, the pins 21 may engage the trailing edges of tabs 12. The applicating drum 20 is further provided with a plurality of cylindrical pockets 22 which are disposed around the periphery of drum 20 in the same spaced relationship as the container receiving aperture 11. Each pocket 22 is of sufficient diameter to permit the top portions of container C to freely enter therein as the applicator drum 20 is rotated over an advancing line of container C. Thus, the diameter of pockets 22 will be slightly greater than the diameters of the container apertures 11, because each container aperture 11 must be expanded as it moves over the enlarged chime portion C–1 of the container C so as to snugly and resiliently engage the body of container C.

The containers C are successively moved into alignment with the pockets 22 of applicating drum 20 by a suitable lineally moving conveyor belt 30 on which are provided shallow container cups or recesses 31 into which the successive containers C are loaded either automatically or manually. The spacing of cups 31 corresponds to the spacing of container apertures 11, and the peripheral speed of applicator drum 20 is synchronized with the lineal speed of conveyor 30 so that as each container C approaches the applicator drum, its top portions will enter the applicator drum pockets 22 and each successive aperture 11 in the carrier web 10 will be forced into assembled relationship with a container C.

Lastly, as illustrated in FIGURE 6, two lines of containers C assembled into their respective carrier web portions 10a and 10b are moved by a suitable conveyor 32 and rails 33 into side-by-side parallel relationship so that the tab portions 12 of each container web portion are disposed in overlying contiguous relationship. Such tab portions may be then conveniently joined by any one of a plurality of well-known techniques, namely, heat sealing, riveting, or through the use of an interposed adhesive. The apparatus 34 for performing such joining and securing operation is entirely conventional and hence is indicated only diagrammatically. Concurrently with the joining of the tab portions 12, a handle 14 may also be secured to the tab portion 12, if desired. After such tab joining operation, the united webs 10a and 10b are severed by conventional equipment (not shown) to form the individual six-packs.

After reviewing this disclosure, the logical question arises as to the necessity for separately applying the container webs 10a and 10b to two rows of containers. One may ask why not integrally form the two web segments as a single web and simultaneously apply two side-by-side container apertures of such integral web to two containers C by the "roll on" technique? Such procedure fails in practice because the overlapping lateral expansion of one container receiving aperture would be in direct conflict and interfering with the simultaneous lateral expansion of a laterally adjacent aperture. This is the reason that the apparatus shown in U.S. Patent No. 3,032,943 must resort to the complexity of individual spreaders for each container aperture.

Figure 8:
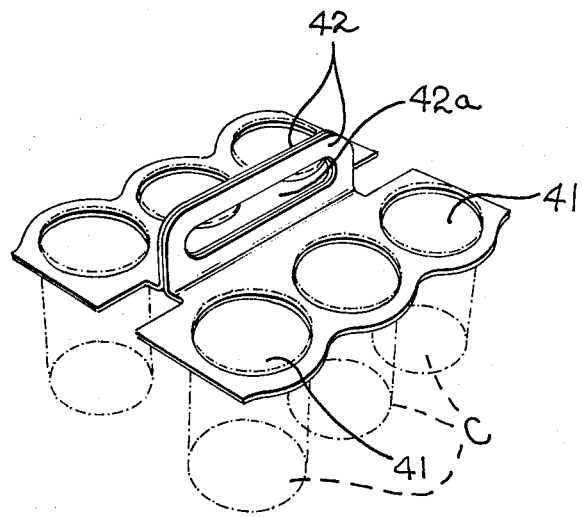
FIGURE 8 is a perspective view illustrating the assembly of two FIGURE 7 carrier segments to form a completed carrier.

The principles of this invention may be advantageously applied to produce a container carrier wherein the handle defining portions of the carrier are integrally formed on the respective web segments. Referring to FIGURES 7 and 8, there is shown a modified carrier segment web 40 defining a plurality of longitudinally aligned container receiving apertures 41. At spaced intervals along one edge of the web 40 integral lateral projections 42 are provided, such projections being formed in the same punching operation as produces the container receiving apertures 41, and a slot 42a (or if desired, fingerholes) is formed in each projection 42. Each carrier segment web 40 is then assembled by a simple rolling action onto a separate line of containers C, similar to the procedure illustrated in FIGURES 4 and 5. Then the carrier segment webs 40 are moved together to bring the respective rows of secured containers into side-by-side relationship, the projections 42 are folded upwardly relative to the plane of the remainder of the web 40 and are thus brought into abutting relationship with the similar projections on the adjacent carrier web 40. The abutting handle defining projections 42 may then be conveniently secured together by heat sealing, stapling or adhesives. It will be readily apparent that the disposition of the handle defining projections 42 in a vertical plane above the plane of the carrier webs 40 and the tops of the containers assembled therein makes the uniting of such portions 42 an even more simple mechanical operation than that required in the embodiment of FIGURE 6. The resulting carrier, with the containers assembled therein, will then appear as shown in FIGURE 8.

From the foregoing description, it is apparent that the container carrier embodying this invention and the method of assembling such carrier provides a high-speed, economical process for producing multi-packs of containers. It will be evident to those skilled in the art that modifications of this invention can be made without departing from the teaching of this disclosure or the scope of the following claims.

What is claimed is:

1. A multi-pack container carrier comprising a pair of webs formed from a resilient plastic material, each web having at least two lengthwise aligned apertures therein respectively adapted to snugly engage the top portions of an equal number of containers to hold such in a row, one of said webs having at least one laterally projecting portion adapted to lie in contiguous relationship to a portion of the other web when the containers respectively engaged by the webs are disposed in side-by-side relationship, and means securing said contiguous portions together.

2. The combination defined in claim 1 wherein said last mentioned means comprises a heat seal uniting said contiguous portions.

3. The combination defined in claim 1 plus a handle for said carrier, said handle being secured to said webs by said last mentioned means.

4. The combination defined in claim 1 wherein said projecting portion is bent upwardly relative to the carrier and defines a carrying handle.

5. A multi-pack container carrier comprising a pair of webs formed from a resilient plastic material, each web having at least two lengthwise aligned apertures therein respectively adapted to snugly engage the top portions of an equal number of containers to hold such in a row, one of said webs having at least two laterally projecting tab portions respectively adapted to lie in contiguous overlapping relationship with spaced surface portions of the other web when the containers respectively engaged by the webs are disposed in side-by-side relationship, and means for respectively securing the overlapped portions together.

6. The combination defined in claim 5, plus a separate handle for said carrier, the ends of said handle being respectively secured to said webs by said last mentioned means.

7. The method of assembling containers in a multi-pack container carrier of the type comprising two webs having at least two lengthwise aligned apertures therein respectively adapted to snugly engage the top portions of an equal number of containers to hold such in a row, one of the webs having at least one laterally projecting portion adapted to lie in contiguous relationship to a portion of the other web when the containers respectively engaged by the webs are disposed in side-by-side relationship, comprising the steps of
   (1) separately assembling each web onto a row of containers,
   (2) moving the two web assembled rows of containers into side-by-side parallel relationship, and
   (3) securing together the contiguous portions of the webs.

8. The method of assembling containers in a multi-pack container carrier of the type comprising a pair of webs formed from a resilient material, each web having at least two lengthwise aligned apertures therein respectively adapted to snugly engage the top portions of an equal number of containers to hold such in a row, each of the webs having a laterally projecting handle defining portion folded upwardly relative to the plane of the web and adapted to lie in contiguous relationship to the handle-defining portion of the other web when the containers respectively engaged by the webs are disposed in side-by-side relationship, comprising the steps of
   (1) separately assembling each web onto a row of containers,
   (2) moving the two web assembled rows of containers into side-by-side parallel relationship, and
   (3) securing together the contiguous handle defining portions.

9. The method of assembling containers in a multi-pack container carrier of the type comprising two webs, each having at least two lengthwise aligned apertures therein respectively adapted to snugly engage the top portions of an equal number of containers to hold such in a row, one of the webs having at least two laterally projecting portions adapted to lie in contiguous, overlapped relationship to spaced portions of the other web when the containers respectively engaged by the webs are disposed in side-by-side relationship, comprising the steps of
   (1) separately assembling each web onto a row of containers,
   (2) moving the two web assembled rows of containers into side-by-side relationship, and
   (3) positioning a handle with its ends respectively overlying the overlapped portions of said webs, and
   (4) concurrently securing together the handle ends and the overlapped web portions.

References Cited

UNITED STATES PATENTS 2,415,218   2/1947   Rhodes et al. _____ 53—48 X

TRAVIS S. McGEHEE, *Primary Examiner.*

R. L. SPRUILL, *Assistant Examiner.*